Sept. 9, 1969 F. DIAS 3,466,399
STEREO RECEIVER SUITABLE FOR INTEGRATED CIRCUIT CONSTRUCTION
Filed Dec. 6, 1966 4 Sheets-Sheet 1

Inventor
Fleming Dias
By John J. Pederson
Attorney

STEREO RECEIVER SUITABLE FOR INTEGRATED CIRCUIT CONSTRUCTION

Filed Dec. 6, 1966 4 Sheets-Sheet 2

Inventor
Fleming Dias
By John J. Pederson
Attorney

STEREO RECEIVER SUITABLE FOR INTEGRATED CIRCUIT CONSTRUCTION

Filed Dec. 6, 1966 4 Sheets-Sheet 3

Inventor
Fleming Dias
By John J. Anderson
Attorney

Inventor
Fleming Dias
By John J. Pederson
Attorney

United States Patent Office 3,466,399

Patented Sept. 9, 1969

3,466,399

STEREO RECEIVER SUITABLE FOR INTEGRATED CIRCUIT CONSTRUCTION

Fleming Dias, Chicago, Ill., assignor to Zenith Radio Corporation, Chicago, Ill., a corporation of Delaware Filed Dec. 6, 1966, Ser. No. 599,468

Int. Cl. H04j 3/02

U.S. Cl. 179—15 8 Claims

ABSTRACT OF THE DISCLOSURE

A receiver for stereophonic program signals wherein demodulation of a received stereophonic subcarrier signal is accomplished by inductorless demodulation circuitry suitable for integrated circuit construction. An L-C type filter, located between the receiver frequency modulation detector and integrated circuit stereo demodulator, and tuned to the pilot carrier frequency, extracts the pilot signal from the composite signal with a sufficiently high signal-to-noise ratio to permit derivation of a continuous-wave demodulation signal at the subcarrier frequency within the integrated-circuit demodulation stages without the provision of further tuned circuitry therein.

The present invention relates generally to receivers for stereophonic program signals and, more particularly, is directed to new and improved receivers of the foregoing type especially suited for construction either wholly or in part by integrated circuit techniques.

Today electrotechnology is at the threshold of a startling new and different era in circuit fabrication and design. It is foreseeable and, in many instances now practical, to manufacture electrical circuits which occupy a volume many hundreds or thousands of times smaller than even their equivalent transistor predecessors. The advantages of such size reductions are manifest, but of far greater significance are the marked economies and excellent reliability potentially realizable with integrated circuits.

However, utilization of these circuits in certain environments poses substantial challenges to the ingenuity of the electronics engineer. Simple substitution or interpolation in going from conventional to integrated circuits, such as was usually the case in transition from tube to transistor circuits, is not always feasible, as the device limitations and ground rules for design of integrated circuits are in some respects quite distinct from those of present day circuits. For example, by this new art transistors and similar semiconductor devices are rather easily and economically made while capacitors and resistors are difficult to obtain in a large range of values. In monolithic circuits capacitors larger than a few hundred picofarads and resistors greater than ten thousand ohms are difficult to realize. The situation is, however, several orders of magnitude better with thin film circuits. Furthermore, at present integrated inductors as such do not exist and, accordingly, the effects of these devices must be either synthesized through use of permissible circuit elements or, alternatively, ordinary inductors interconnected where appropriate to the integrated modules. The former approach imposes the problem of designing and selecting simulated inductive circuits matched to the overall circuit combination or system, in many cases a formidable task; the latter, in instances where inductors are distributed throughout the circuit, dictates a number of delicate and expensive connection points between the integrated module and the inductors, or the use of a plurality of modules with the inductors strung therebetween, both of which arrangements tend to defeat the purpose and utility of integrated circuits.

The foregoing problems associated with transformation to integrated circuits are aptly exemplified by reference to a preferred type of discrete component stereo receiver disclosed and claimed in Patent 3,151,217—Dias which is assigned to the same assignee as the present invention. In this patent, there is shown a stereo demodulator which utilizes three tuned inductors and three more inductor coils each magnetically coupled to a respective one of the tuned circuits. These latter coils provide phase splitting and direct current isolating functions. The tuned inductors are useful as frequency selective filters for a pilot signal and in doubling its frequency to develop a demodulation signal required in reproducing the separated stereo signals.

It is a primary object of the present invention to provide a new and improved stereo receiver susceptible of construction wholly or in part by integrated circuit techniques.

It is a primary object of the present invention to provide a new and improved stereo receiver susceptible of construction wholly or in part by integrated circuit techniques.

It is a further object of the present invention to provide a stereo receiver including novel circuit combinations especially well-mated to the limitations and requirements of integrated circuits.

It is another object of the present invention to provide a hybrid stereo demodulator circuit utilizing ordinary inductors as tuned circuit elements while obviating the aforenoted disadvantages associated therewith.

It is yet another object of the present invention to provide a stereto receiver having novel, inductorless circuitry.

Accordingly, the invention is directed to a receiver for developing a pair of stereophonically related program signals from a received transmission comprising a carrier which is frequency-modulated in accordance with (a) the sum of two audio signals, (b) a subcarrier signal which has been suppressed-carrier amplitude-modulated with the difference of the two audio signals and (c) a pilot signal subharmonically related to the subcarrier signal. Specifically, the receiver comprises a frequency modulation detector responsive to the carrier for deriving a composite signal representing the modulation of the carrier and an integrated solid-state demodulation signal generator and stereo detector means, consisting of untuned stages all of the bilateral passive circuit elements of which are resistive or capacitive, for developing a subcarrier demodulation signal in response to the pilot signal and for deriving the pair of stereophonically related program signals in response to the audio sum signals, the difference signal modulation and the developed subcarrier demodulation signal. Also included are tuned-inductor circuit means, coupled between the frequency modulation detector and the generator and stereo detector means, for selectively extracting the pilot signal from the composite modulation with a signal to noise ratio of a magnitude sufficiently high to permit derivation of the demodulation signal within the generator and stereo detector means without provision of frequency tuned circuitry therein.

In accordance with further aspects of the present invention, a stereo receiver having an integrated, solid-state stereo detector and demodulation signal generator means is further provided with resistance-capacitance filter means or alternatively an inductorless sampled data filter means for selecting the pilot signal from the composite modulation function.

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

FIGURES 4a–4f are graphical representations useful in understanding the operation of the circuit of FIGURE 3;

Before considering the invention, it is first appropriate to comment upon the character of the stereophonic transmission. This signal, as prescribed by the specifications of the Federal Communications Commission, comprises a carrier which is frequency-modulated in accordance with the sum of two audio signals. The carrier is also frequency-modulated in accordance with both sidebands of a subcarrier signal which has been suppressed-carrier amplitude-modulated with the difference of the same two audio signals. Since the transmission includes a suppressed-carrier component, a pilot signal prescribed at one-half the frequency of the absent subcarrier is also frequency-modulated on the principal carrier to facilitate synchronization of receiver instruments. A comprehensive explanation of the theory and operation of the FCC approved stereo transmission and reception system is provided in Patent 3,257,511 to Adler et al.

Figure 1:
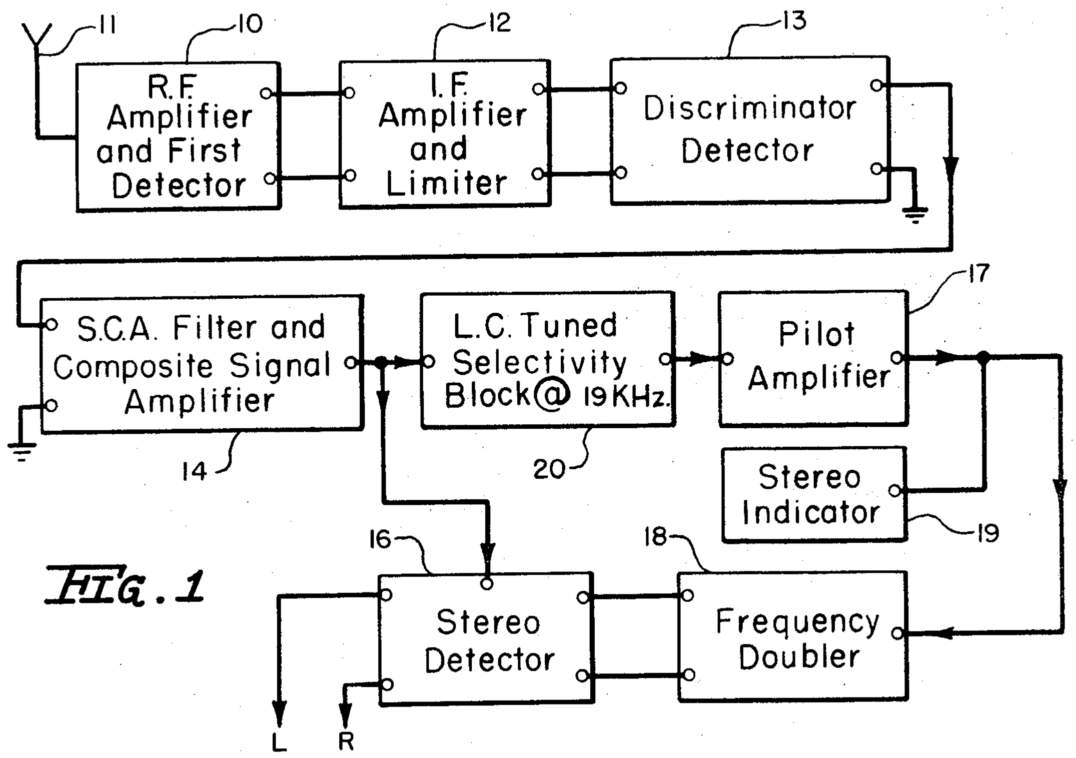
FIGURE 1 is a block diagram representation of a preferred embodiment of a stereo receiver of the present invention utilizing inductors in a novel manner.

Referring now to FIGURE 1, the arrangement there shown comprises receiver circuits which through the SCA filter and composite amplifier are conventional, although in connection with other figures to be described, it is preferred that these stages be constructed as integrated circuitry. These include a radio frequency amplifier of any desired number of stages and a heterodyning stage or first detector, both being represented by block 10. The input of the amplifying portion connects with a wave-signal antenna 11 and the output is coupled to a unit 12 which may include the usual stages of intermediate frequency amplification and one or more amplitude limiters. Following IF amplifier and limiter 12 is a frequency modulation detector 13 responsive to the amplitude limited IF signal for deriving an output waveform representing the modulation of the received carrier. Second detector 13 may be of any well-known configuration, but since a high degree of amplitude limiting is desirable, it is preferable that this unit be a ratio detector. The composite modulation signal developed at the output of detector 13 is applied to a SCA filter and composite signal amplifier labelled 14. The filter of block 14 serves as an attenuator for the subcarrier frequency used for Subsidiary Communications Authorization (SCA) reception, a subscription background music service authorized by the Federal Communications Commission.

A stereo detector 16 is coupled to the output of composite amplifier 14 and is responsive to the audio sum signal, the suppressed-carrier amplitude-modulated difference signal and a demodulation signal developed from the pilot tone and having a frequency and phase equal to that of the absent subcarrier for deriving a pair of stereophonically related audio signals, schematically indicated L and R in the drawing. The L and R audio signals are applied to individual amplifying and reproducing apparatus, not shown, the loudspeaker portions of which are, of course, spatially arranged to create a stereophonic sound pattern in the area they serve.

Since, as explained, the absent subcarrier must be recreated at the receiver, demodulation signal generator means are provided to effect this end. These means include a pilot amplifier 17 and a frequency doubler 18. A stereo indicator mechanism 19 is coupled to the output of amplifier 17 and is responsive to the presence of the pilot to provide an indication of stereo reception via an indicator lamp or the like. Of course, block 19 is not essential and may be omitted if desired. In accordance with the invention, the stereo detector and demodulation signal generator means is constructed as an integrated, solid-state unit consisting of untuned stages of which all the bilateral passive circuit elements are resistive or capacitive, without the provision of any frequency tuned circuitry therein. Furthermore, in the unique combination of the present invention, there is no sacrifice in pilot frequency selectivity as compared with that of conventional receivers, and there is no requirement for multiple interconnections between the integrated circuit means and tuned inductors of other stages.

Specifically, the foregoing advantages are realized by provision of a single selectivity block 20 comprising tuned inductors and preceding the generator and stereo detector means. Block 20 is provided with tuned circuitry having a passband sufficiently narrow to extract the pilot tone from the composite signal with a signal to noise ratio adequate to permit derivation of the demodulation signal within the integrated circuit stages 16–18 without the provision of further tuned circuitry therein. More particularly, filter 20 is constructed to have a circuit Q of at least 50 and, preferably is designed with a Q of 60 or greater to sharply attenuate a 20 kHz. control signal used by some broadcasters in connection with a "Simplex Service" for background music; such a characteristic has been found quite adequate in practice. Although it will be recognized by those skilled in the art that a tuned inductor circuit of the aforesaid Q is readily constructable, an example of one satisfactory circuit will be described later herein.

Before proceeding further, it should be understood that the expression "integrated circuits" as used in the present specification and the appended claims is intended to be a broad and generic term embracing, inter alia, present integrated circuits of the monolithic, thin and thick film types. As used in the art, the term monolithic is descriptive of circuits which are formed as a volume unit without apparent distinct parts; on the other hand, thin film circuits have distinguishable individual components placed adjacent one another by well-known thin film deposition techniques, as vapor deposition, on a base or substrate. Thick films differ physically from thin films as their respective names denote; also the former structures are usually made by a screening rather than a vapor deposition process.

It is obvious that the above-described circuit arrangement of the invention greatly relaxes the component and functional requirements on the stereo detector and generator means in terms of compatibility of these elements with integrated circuits. Accordingly, a variety of integrated circuit forms may be taken by functional blocks 16, 18 and 19 of FIGURE 1 within the scope of the known art. A preferred circuit construction will, however, be described in detail later herein.

Figure 2:
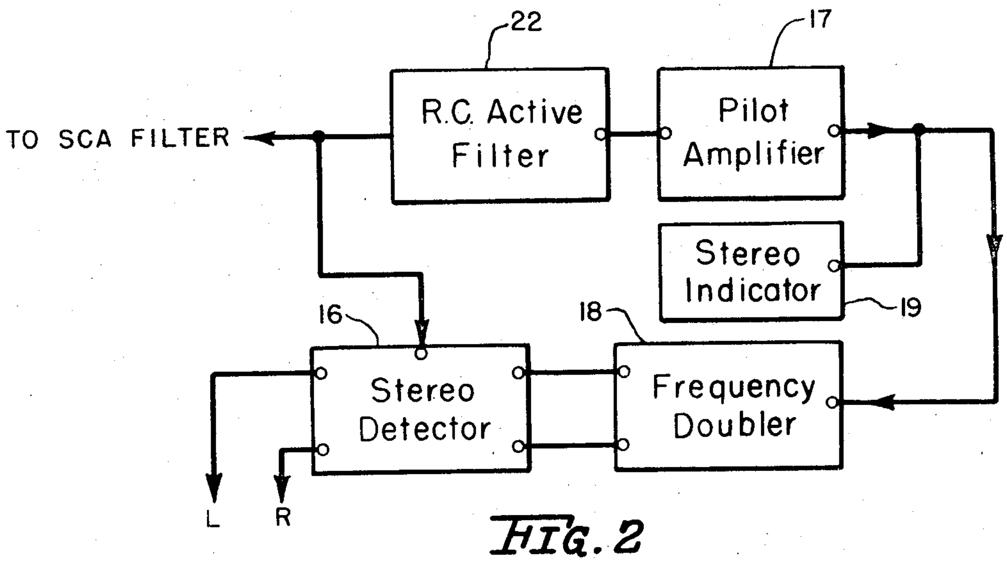
FIGURE 2 is a block diagram of the novel portion of a second preferred embodiment of the invention using resistance-capacitance active filter means.

Referring now to FIGURE 2, there is shown a partial block diagram of a modified form of the stereo receiver of FIGURE 1; SCA filter 14 and the preceding circuitry considered in connection with FIGURE 1 may be conventional and of the form previously described, therefore, it is not again illustrated. Herein the tuned inductor circuit 20 of FIGURE 1 is replaced by a resistor-capacitor active filter means 22 having frequency selectivity characteristics substantially identical to those of block 20. It has been found that the characterisics of this type of filter are compatible with the requirements of stereo reception. As is understood in the art and as will be described more fully later herein in connection with a preferred filter construction of this type, means 22 does not employ any inductors, i.e., it is inductorless, and is readily susceptible to constructon by known integrated circuit techniques. Accordingly, all of the circuitry illustrated in FIGURE 2 may be comprised of a single integral solid-state unit, for example, a single monolithic chip of semiconductor material or several monolithic chips appliqued on a thin film substrate.

Figure 3:
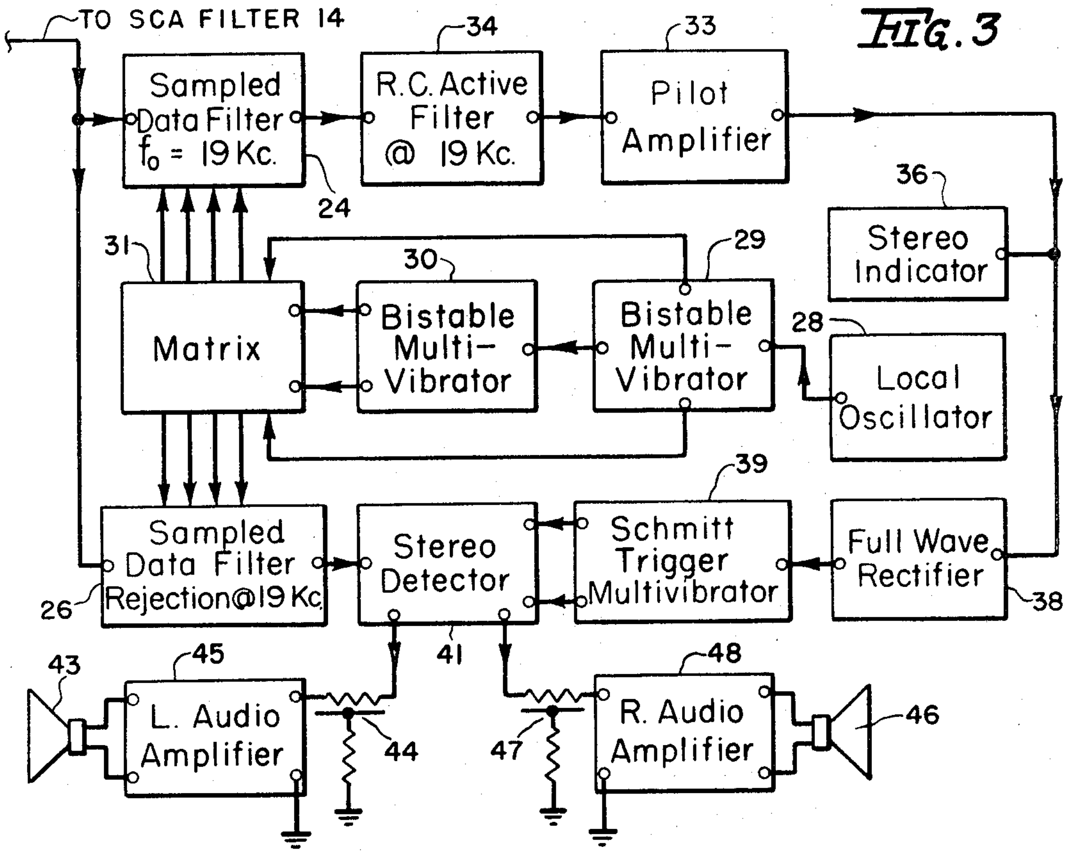
FIGURE 3 is a block diagram of the novel portion of yet another preferred embodiment of the invention using sampled data filter means.

In FIGURE 3, there is shown a further preferred embodiment of a portion of a stereo receiver which, like the construction of FIGURE 2, includes pilot signal filter means readily constructable by known integrated circuit techniques. Specifically, this embodiment comprises a sampled data bandpass filter means 24 and a sampled data band-rejection filter 26 both of which are coupled to receive the composite stereo modulation signal available at the output of SCA filter 14; of course, block 14 is coupled to blocks 10–13 as previously described in connection with FIGURE 1. Filter 24 inherently provides a complex filter characteristic with at least a primary passband centered at a selected first frequency and, in general, a number of secondary passbands spaced by multiples of the first frequency. In the present environment, the primary passband of filter 24 is centered at approximately the pilot signal frequency while the similarly complex characteristic of filter 26 is provided with a primary frequency rejection band centered at approximately the pilot frequency. Filters 24 and 26 are complementary in the sense that the passbands of filter 24 occur at the same frequency as the rejection bands of filter 26. Solely to move component values more comfortably within the tolerance ranges of the integrated circuit art, it is presently preferred to design this filter for a center frequency somewhat above that of the pilot tone. The only adverse effect of this accommodation is the development of the pilot tone in a slightly less than peak or optimum amplitude.

In accordance with a further aspect of the invention, the sampling intervals of both filters 24 and 26 are controlled from a common source comprising a local oscillator 28 having a nominal operating frequency in the vicinity of four times that of the pilot signal. Oscillator 28 is coupled to a first bistable multivibrator 29 which in turn operates a second multivibrator 30 of similar construction. Multivibrators 29 and 30 successively halve the frequency of oscillator 28 to develop output signals at approximately $2f_0$ and $f_0$, respectively, where $f_0$ is the frequency of the stereo pilot. As shown, the outputs of devices 29 and 30 are algebraically combined in matrix box 31 to develop four square-wave input signals to each of the filter means. These input signals fix the number and duration of the sampling intervals for each filter. In the illustrated case, each filter develops four sampling intervals per cyclic period of the pilot signal with the duration of each sampling period being such that the four equal duration sampling intervals cumulatively occupy the entire time period, that is, the several sampling intervals are time contiguous.

It has been found that four sampling intervals are very easy to achieve using two bistable multivibrators and are quite adequate to establish the required selectivity for the stereo receiver; accordingly, such an arrangement is preferred, although it will be understood that a greater number of sampling intervals may be had by obvious modification of the present circuit. For instance, an eight interval sampling period is obtained by altering the frequency of oscillator 28 to eight times that of the pilot and inserting a third multivibrator in series with multivibrators 29 and 30. Proper matrixing of the outputs from the three multivibrators provides eight equal duration square-wave sampling signals. Filters 24 and 26 are composed of basic sampling circuits coupled in series and of a number corresponding to the number of desired sampling intervals. Accordingly, these filters are readily accommodated to handle any number of sampling inputs, as will be apparent when a filter of this type is considered in detail later herein.

A pilot signal amplifier 33 is coupled to filter means 24 by a resistor-capacitor active filter 34 which may conveniently have a relatively broad passband characteristic centered at the pilot frequency. Pilot amplifier 33 is coupled to a stereo indicator 36 and to the input stage of a block diagram representation of a preferred stereo detector and demodulator signal generator means. The schematic circuit of this means is illustrated in a later figure and will be discussed fully. Suffice it to say for now that this means comprises a full-wave rectifier 38 which directly actuates a Schmitt trigger type multivibrator 39 to provide a demodulation signal synchronized in frequency and phase to the suppressed subcarrier for application to a stereo detector 41. Detector 41 also receives an input from filter means 26 comprising the composite stereo information less the pilot signal rejected by this filter. The rejection of 19 kHz. is essential only where SCA transmission is used as otherwise an annoying "swish" is produced by the interaction of the third harmonic of 19 kHz. and the frequencies in the SCA channel. Detector 41 processes this information to derive a pair of stereophonically related output signals which are coupled to appropriate individual amplifying and reproducing apparatus. An L or left audio signal is coupled to a loudspeaker 43 through a conventional 75 microsecond de-emphasis and subcarrier notch filter 44 and an audio amplifier 45. Similarly, the right or R audio signal is coupled to a loudspeaker 46 through a similar de-emphasis and notch filter network 47 and an audio amplifier 48. Of course, the loudspeakers are arranged spatially to create a stereophonic sound pattern.

Figures 4, 5:
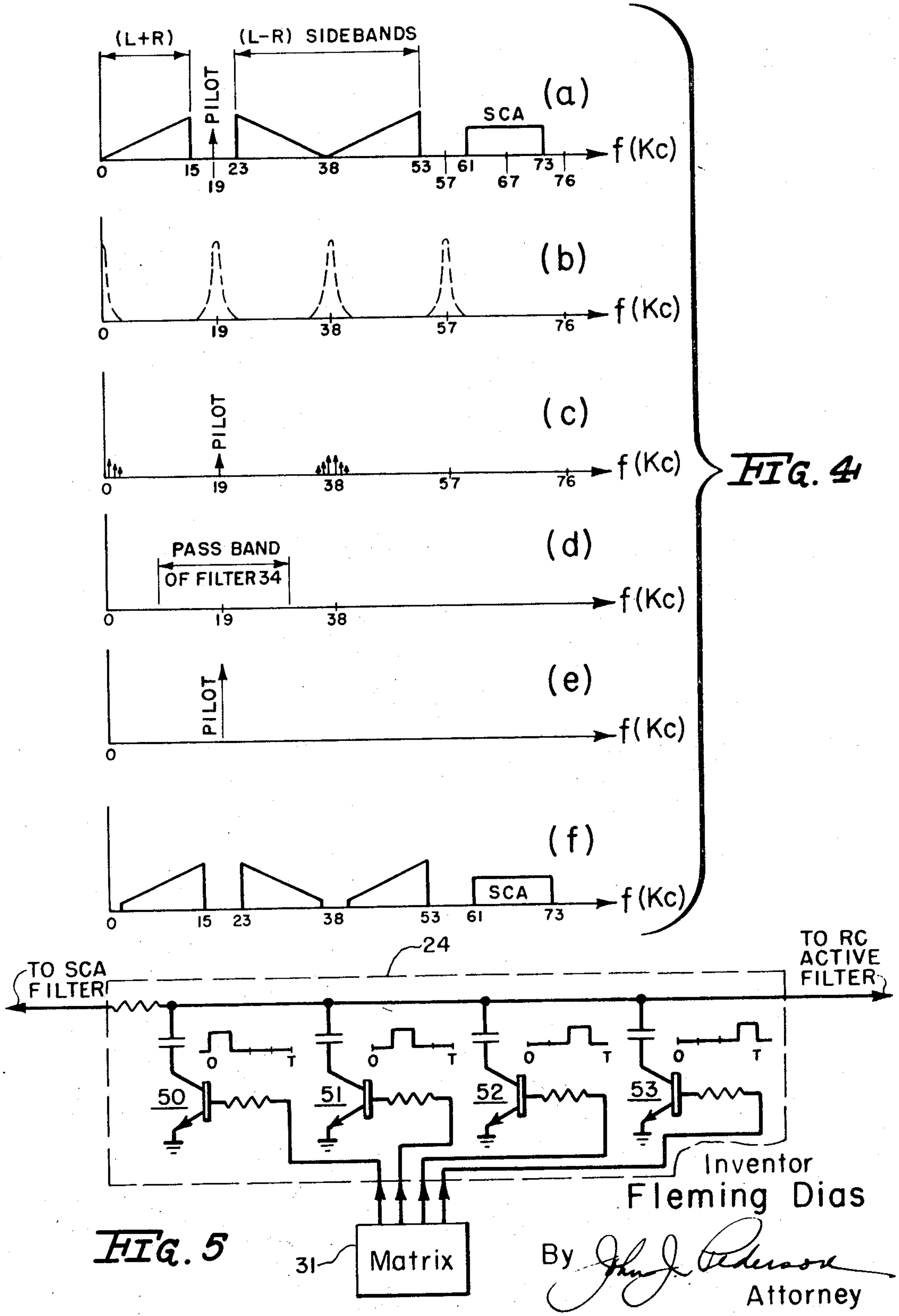
FIGURE 5 is a schematic circuit diagram of a portion of a sampled data filter section of the type depicted in block form in FIGURE 3.

A more complete understanding of the operation of the circuit of FIGURE 3 and especially the mode of operation of filters 24, 26 and 34 may be had by reference to the graphical representations of FIGURE 4. FIGURE *4a* is a plot of the frequency spectrum of a composite stereophonic signal; also shown on the graph is that portion of the frequency spectrum which may permissively be occupied by the information portion of a subsidiary communications (SCA) transmission. FIGURE *4b* is a frequency plot of the passband of first filter means 24 which has a "comb-like" characteristic consisting of a primary passband at approximately the pilot signal frequency and a plurality of secondary passbands located a pilot signal frequency intervals on either side of the primary passband. FIGURE *4c* depicts the signal output at filter means 24. It is observed that the sampled data filter has a characteristic of passing substantially only the pilot signal frequency despite the plurality of undesired secondary passbands inherently present. The residual, undesired information depicted in FIGURE *4c* is easily attenuated and the pilot signal substantially amplified by use of a simple RC active filter 34 which may have a relatively broad passband characteristic. Since in the present state of the art, RC filters are relatively unstable, i.e., their passbands tend to drift to either side of the selected middle frequency unless sophisticated control circuits are employed, a broad passband lessens design tolerances while still fully accomplishing the desired function. FIGURES *4d* and *4e* respectively illustrate the passband of filter 34 and the amplified pilot frequency output of this filter. FIGURE *4f* depicts the output of second sampled data filter 26 which is operated in a rejection mode, i.e., the dashed frequency intervals depicted in FIGURE *4b* are rejected by this filter while all other frequencies pass unattenuated except for the inherent insertion loss of the filter. The use of a rejection mode filter preceding stereo detector 41 precludes undesired heterodyning of the signal content of the SCA channel and harmonics of the stereo pilot signal. In the absence of such filtering, an annoying "swish" having a complex frequency composition is developed at the output of the respective loudspeakers.

Sampled data filters are known in the art to display sharp and narrow passband characteristics, in addition to being relatively stable and readily susceptible to construction by well-understood integrated circuit techniques. The present invention is based in part on the original and surprising recognition of a unique relationship between the passband characteristics of such filters, in both the band-pass and band-rejection modes, and the signal composition of currently approved FCC stereophonic transmissions, in that the secondary response bands are all located at zero- or low-amplitude signal frequencies so that the desired primary response can be separated from the output of the band-pass sampled data filter by the use of a simple RC bandpass filter while there is substantially no loss of desired signal information from the output of the band-rejection filter.

An example of a specific construction of sampled data filter 24 may be had by reference to the partial schematic diagram of FIGURE 5. This filter comprises four similar NPN transistors 50–53 successively connected in identical fashion as shunt switches for a signal bearing conductor 54. Specifically, the emitters of each of these transistors are coupled directly to ground and the collectors connected to conductor 54 through respective individual capacitors. The informational signal on conductor 54 provides a requisite operational biasing of the transistor collector electrodes. Additionally, the base electrodes of each transistor are connected through individual current limiting resistors to respective outputs of matrix 31. As shown graphically adjacent each transistor, matrix 31 develops a series of square-wave output pulses of like duration and occupying respective one-quarter portions of a time interval T. This time period T corresponds to the duration of a single cycle of the primary frequency to be passed by the filter, in this case 19 kHz. and each of the pulses is displaced in time from that applied to its adjacent transistor by 90 degrees or a one-quarter period. Hence, each of transistors 50–53 is successively gated to an on or conductive condition for a corresponding portion of the interval T. A more complete understanding of the operation and theory of such filters may be had by reference to Final Report AF33[615]–1242, Wright-Patterson Air Force Base, Dayton, Ohio. Copies of this report are available from the Defense Documentation Center, Cameron Station, 5010 Duke St., Alexandria, Va., 22314.

Figure 6:
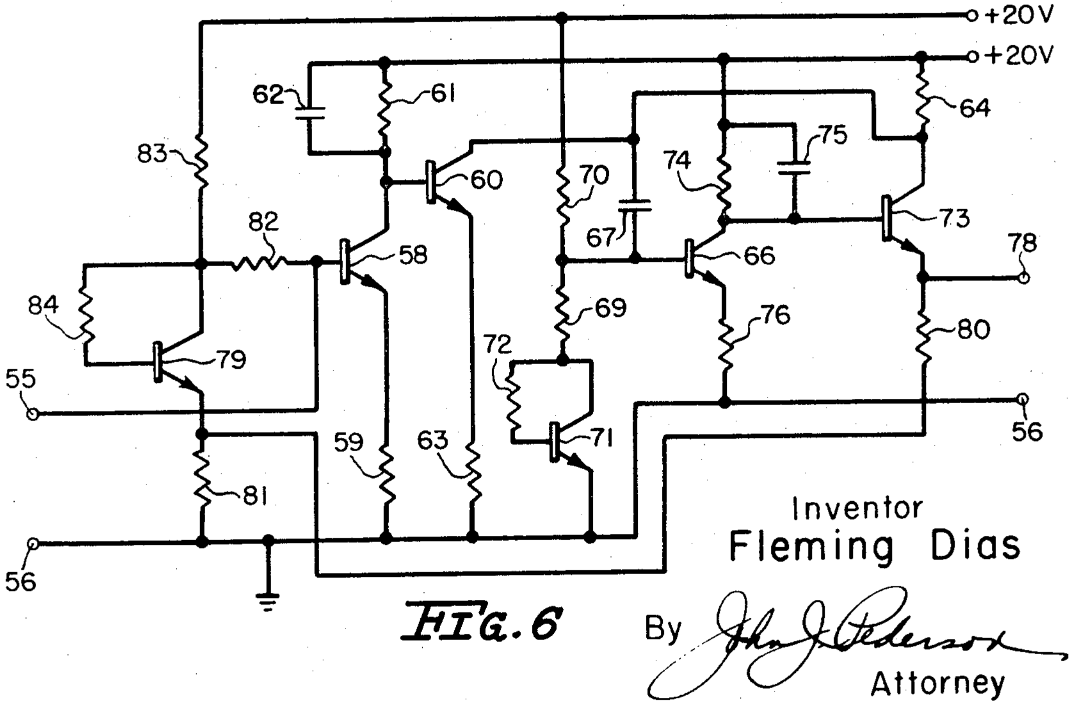
FIGURE 6 is a schematic circuit diagram of a resistor-capacitor active filter means of the type represented in block form in FIGURE 2.

A schematic illustration of a known resistor-capacitor active filter suitable for use in the embodiment of the invention shown in FIGURE 2 is illustrated in FIGURE 6. The configuration of such a filter is basically that of an amplifier with controlled multiple feedback loops used to desensitize the unit to variations in temperature and in transistor gain. Such desensitizing is essential as the circuit must be brought to the verge of oscillation in order to perform the desired filtering function; absent desensitizing the circuit may break into oscillation or the passband thereof may drift considerably from the desired median frequency. A somewhat simpler version of the present circuit is suitable for use in the embodiment of the invention depicted in FIGURE 3.

Considering now the circuit construction, an input to the filter is provided between a terminal 55 and a common or ground terminal 56. Terminal 55 is coupled to the base electrode of an amplifier transistor 58. The emitter of this transistor is coupled to ground through a small resistor 59 while the collector is connected to the base electrode of a second amplifier transistor 60 and to a B+ supply through a load resistor 61 bypassed by a filter capacitor 62. The emitter of transistor 60 is coupled to ground through a resistor 63; the collector electrode is coupled to the B+ supply by a load resistor 64 and to the base of a succeeding transistor 66 by a coupling capacitor 67. The base electrode of transistor 66 is provided with a constant steady state current input from the junction of a pair of load resistors 69 and 70 of a transistor 71. The collector of transistor 71 is coupled to its base electrode through a bias resistance 72. The collector of transistor 66 is coupled directly to the base of yet another transistor 73 and to the B+ supply through a resistor 74 bypassed by a capacitor 75. The emitter of transistor 66 is coupled to ground by a resistor 76. The output of the filter is available between the emitter terminal 78 and common terminal 56. The emitter of transistor 73 is also returned to the emitter electrode of a transistor 79 by a feedback resistor 80. The emitter of transistor 79 is coupled to ground through a resistor 81 while its collector is connected to the common junction of resistors 82, 83 and 84 which are respectively coupled to terminal 55, the B+ supply, and the base electrode of transistor 79. Transistor 79 is a unity gain, non-inverting amplifier which functions to provide a constant steady state collector current to transistor 58. Transistor 79 cooperates with respect to transistor 58 as does transistor 71 with respect to transistor 66. A minor positive feedback loop exists between transistor 73 and the base of transistor 66 while feedback resistor 80 establishes a major negative feedback loop to the emitter junction of transistor 79. Due to the application of these multiple nested feedback loops, the overall amplifier response simulates that of an LCR tuned circuit.

The theory of operation of the filter just described is exceedingly complex and an understanding thereof is unnecessary for a complete appreciation of the present invention and for these reasons will not be considered in further detail. However, a complete understanding of filter circuits very similar to that illustrated may be had by reference to a published Engineering Research Laboratory Report No. 65–31 AF–AFOSR–139–64/139–65, University of California, Berkeley, Calif., and entitled "Synthesis of Integrated Selective Amplifiers for Specified Response and Desensitivity" by Ammon Gaash which is available on request from the University of California.

Figure 7:
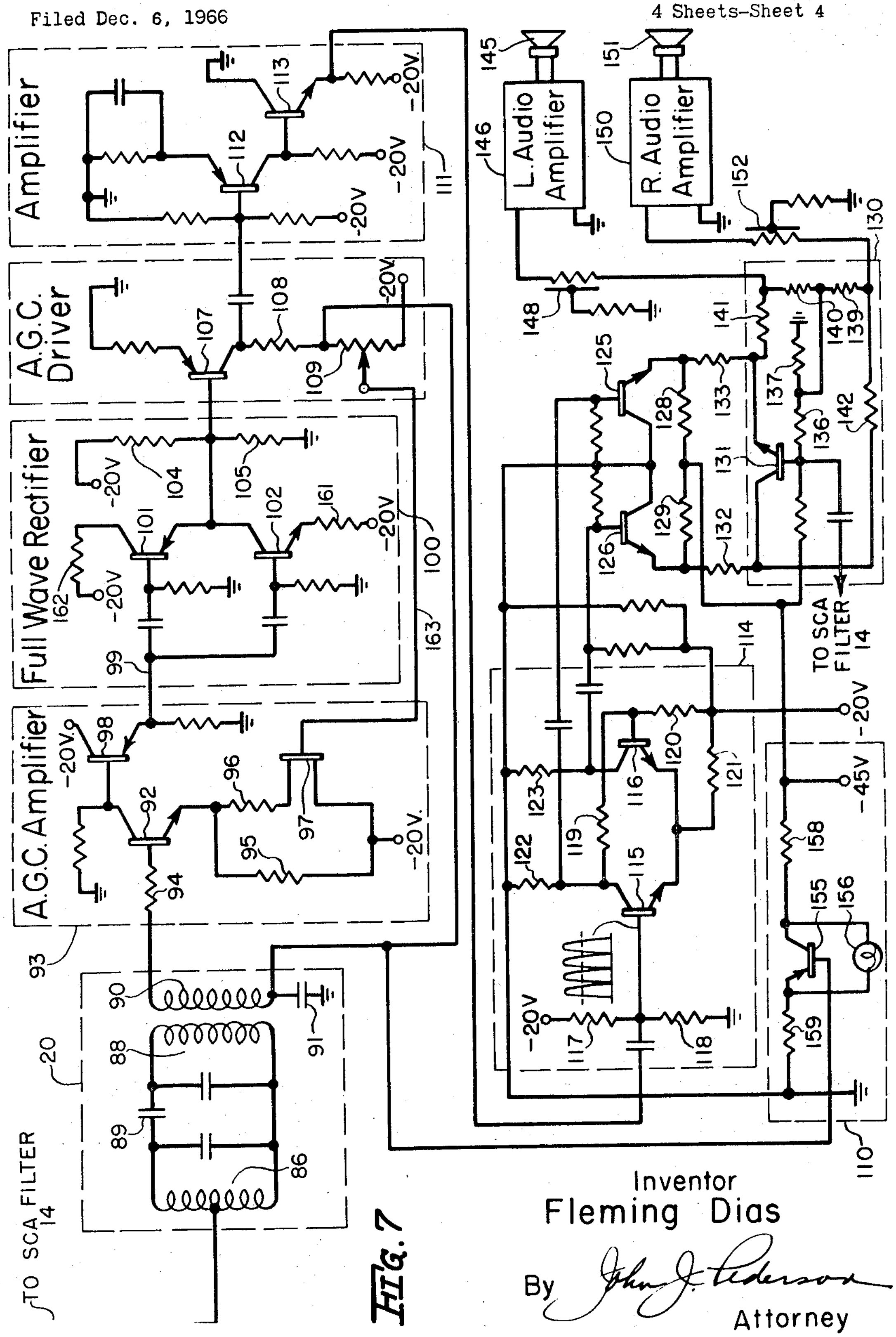
FIGURE 7 is a schematic diagram of preferred stereo receiver circuitry, a major portion of which is useful in the embodiments of either FIGURES 1, 2 or 3.

A preferred demodulation signal generator and stereo detector means likewise aptly suited for integrated circuit construction is shown in FIGURE 7. This circuit is suitable for use with any of the systems shown in FIGURES 1 through 3 and because of novel circuitry to be described is to be preferred for use in all these systems. As shown, the composite stereo signal is applied to a tuned frequency selective block enclosed in a dashed outline 20. Within this block is illustrated the preferred circuitry for the tuned inductor arrangement depicted in FIGURE 1 and, accordingly, the same numeral is applied. Specifically, the circuit comprises a first parallel tuned tank circuit 86 having a tapped input coupled to SCA filter 14 and also connected to a second similarly tuned inductor 88 by a coupling capacitor 89. Each inductor is, of course, tuned to select a pilot signal tone from the composite stereo modulation function. To effect this end and more specifically to sharply attenuate an adjacent 20 kHz. control signal used in the previously mentioned "Simplex Service" for background music, it is preferred that the tuned circuits have a Q of at least 50 and preferably 60 or above.

An output or coupling coil 90 having one terminal bypassed to ground by capacitor 91 is magnetically coupled to tuned inductor 88 through a ferrite core material having a high coupling coefficient. The remaining terminal of inductor 90 is coupled to the base electrode of an NPN transistor 92 of an automatic gain control stage 93 by a resistor 94. The emitter circuit of transistor 92 is coupled to a negative operating source —20 v. and includes a degenerative resistance network composed of a large resistor 95 coupled in shunt with a resistor 96 and the source and drain electrodes of a field effect type transistor 97. As will become apparent, transistor 97 functions as a variable resistance, responsive to a control signal at its base, to adjust the gain of the AGC amplifier 93 within a prescribed range. The collector of transistor 92 is connected to ground through a load resistor and to the base electrode of a PNP emitter follower output transistor 98.

In accordance with a further aspect of the invention, the amplified pilot signal available at an output terminal 99 of emitter follower transistor 98 undergoes full-wave rectification in a succeeding stage, enclosed within dashed outline 100, without provision of either inductor or amplifier type phase-splitting stages. Specifically, this circuit comprises a pair of complementary transistors 101 and 102, of respectively a PNP and NPN gender, so arranged that a pilot signal available at terminal 99 is applied in a common phase to the base electrodes of these transistors through like coupling networks each comprising a series capacitor and a resistor shunted to ground. If desired, the D.C. blocking or coupling capacitors may be eliminated by balancing terminal 99 against ground through use of a suitable voltage divider network and positive and negative polarity power supplies. The emitter electrode of transistor 101 and the collector electrode of transistor 102 are coupled to a common load comprising the common junction impedance of voltage divider resistances 104 and 105 and a succeeding transistor stage to be described. Resistors 104 and 105 likewise provide an operating bias for the several transistors.

Transistors 101 and 102 are operated as Class B amplifiers. Accordingly, on positive half-cycles of the applied pilot signal, only transistor 101 conducts while on half-cycles of opposite or negative phase only transistor 102 is conductive. By well-understood transistor action, the positive phase signals at the base of transistor 101 appear in like phase at its emitter electrode and negative phase half-cycles applied at the base of transistor 102 appear at its collector electrode in an opposite phase, thus resulting in full-wave rectification of the pilot signal as intended. The alternate half-cycles are established at like amplitude by adjusting the relative magnitudes of the emitter resistor of transistor 102 and the emitter resistor 105 of transistor 101. The emitter of transistor 102 and the collector of transistor 101 are coupled by load resistors 161 and 162, respectively, to a —20 v. operating supply for proper transistor biasing.

The rectified pilot signal is coupled to a PNP amplifier transistor 107 which serves as a driver for the automatic gain control system. To accomplish this function, the collector circuit of transistor 107 includes a pair of series connected load resistances 108 and 109, the latter of which is a potentiometer bypassed for the pilot frequency by capacitor 91 and having its adjustable tap returned via a conductor 163 to the base of variable resistance transistor 97. The control signal derived at the potentiometer tap adjusts the gain of transistor 92 via variable resistor transistor 97 such that the pilot signal amplitude is held at a constant level over a given range independent of variations either in circuit components or reception conditions. Of course, the magnitude of this level is established by the setting of the potentiometer tap. A direct connection from the bypassed terminal of potentiometer 109 provides a favorable operating bias for the base of transistor 92 and a control signal for a stereo indicator circuit 110 to be described in response to the presence of a stereo pilot signal exceeding a threshold level.

AGC driver transistor 107 is followed by a substantially conventional linear amplifier 111 comprising a PNP transistor 112 biased for Class A operation and an NPN emitter follower transistor 113. At the output of this stage there is available a full-wave rectified 19 kHz. pilot tone which is utilized in the present receiver as a synchronizing signal to directly develop, without further frequency-tuned circuits, a stereo demodulation signal constituting a replica of the absent subcarrier. The means for effecting this result comprises a multivibrator which in the illustrated and preferred embodiment takes the form of a Schmitt trigger type monostable multivibrator, shown enclosed by dashed outline 114. This device includes a pair of cross-coupled NPN transistors 115 and 116. Under quiescent conditions, transistor 115 is nonconductive and transistor 116 is conductive; a positive going signal exceeding a given magnitude at the base of transistor 115 reverses this situation but only for the duration of the signal. A Schmitt trigger multivibrator circuit which unlike the arrangement here described is used conjointly as both a demodulation signal generator and stereo detector is disclosed and claimed in a copending application Ser. No. 398,950 to Dias et al. and is assigned to the same assignee as the present invention.

Turning now to a more specific consideration of the circuit, the rectified pilot signal is directly applied to the base electrode of transistor 115 by a DC blocking capacitor. This electrode also receives an operating bias from the junction of a voltage divider comprising series connected resistors 117 and 118 extending from source —20 v. to ground. The other multivibrator transistor 116 has its base electrode cross-coupled to the collector electrode of transistor 115 by a resistor 119 and is further connected to a —20 v. supply by a resistor 120. The common emitters of transistors 115, 116 are returned to a —20 v. supply through a small resistor 121 while their collector electrodes are individually coupled to reference or ground potential through respective load resistors 122 and 123. These collector electrodes are also individually connected to emitter follower transistors 125 and 126 of the NPN type through respective coupling capacitors.

Transistors 125, 126 comprise a push-pull output or buffer stage for multivibrator 114. The base electrodes of these transistors receive appropriate operating biases from the center junction of a pair of similar voltage divider networks extending between ground potential and the —20 v. supply. The common ground terminal of these networks is also coupled directly to the collector electrodes of transistors 125, 126. The respective emitter load resistors 128, 129 of these transistors are coupled by a common junction to a —45 v. power supply. A substantially square-wave switching signal of a frequency and phase identical to that of the absent subcarrier is developed between the emitter electrodes of transistors 125, 126 in response to a received pilot signal and is employed to synchronize a stereo detector shown within dashed outline 130.

As previously discussed, a stereo transmission is in a composite form, namely, a sum or $L+R$ audio component and difference or $L-R$ component present as amplitude modulation on a suppressed subcarrier. Reproduction of the separate stereo channels at the receiver requires demodulation of this latter component and matrixing in proper amplitude and phase relationship with the audio sum component. In the present receiver, the stereo detector preferably comprises a single NPN transistor 131 having a pair of load resistors 132 and 133 coupled from its collector and emitter electrodes, respectively, to respective emitter terminals of transistors 126, 125. The base electrode of detector transistor 131 receives the composite stereo information from SCA filter 14 through a coupling capacitor. For reasons that will be made more apparent hereinafter, concurrent application of the subcarrier demodulation signal and stereo information to the described electrodes of detector transistor 131 results in the detected difference signal information being developed at equal levels but opposite polarities in the detector load resistors 132, 133; no other audio components are developed across these resistors.

In order to develop respectively a pure L and a pure R signal, the demodulated $(L-R)$ and $-(L-R)$ audio information must be individually combined or matrixed with a measured amplitude of the audio sum $(L+R)$ signal. As illustrated, a matrix signal is derived from the center tap of a voltage divider comprising a pair of load resistors 136 and 137 coupled between the base of detector transistor 131 and ground potential and is applied to the midpoint of a pair of summing resistors 139 and 140. Like summing resistors 141 and 142 are coupled from the emitter and collector electrodes of detector transistor 131 to the remaining terminals of resistors 140 and 139, respectively. Matrixing takes place at the junctions of resistors 140, 141 and 139, 142 to develop at these junctions pure L and pure R audio signals. As shown, the L audio signal is coupled to a loudspeaker 145 through an audio amplifier 146 and a combined subcarrier notch and de-emphasis filter 148. Similarly, the pure R audio signal is coupled to a loudspeaker 151 by an audio amplifier 150 and a subcarrier notch and de-emphasis filter 152. The respective de-emphasis filters 148, 152 also effectively filter the super-audible portions of the composite matrixing signal and the subcarrier switching signal to preclude possible overloading of the following audio amplifiers. A stereo detector of the type here shown and variations thereof are disclosed and claimed by Patents 3,151,217—Dias and 3,151,218—Dias et al. which are assigned to the same assignee as the present invention.

A visual indication of stereo reception is provided by means 110 which comprises a transistor 155 coupled to shunt a pilot indicator bulb 156. Transistor 155 is normally in an on or saturated condition but in response to a control signal at its base electrode which is indicative of the presence of the stereo pilot tone, this transistor assumes an off or nonconductive condition. In this latter circumstance, indicator bulb 156 is connected in series with a pair of current limiting resistors 158, 159 between a —45 v. supply and ground and lights to denote stereo reception.

In considering the operation of the receiver, it will be assumed initially that a monaural program is being received and, therefore, the signal available at the output of SCA filter 14 consists of only audio frequency information. Under these circumstances, the pilot amplifier and doubler chain is in a quiescent or inoperative state. Specifically, AGC amplifier 92 is in a low gain condition by virtue of the high resistance of transistor 97 in its emitter circuit and the lack of a favorable bias at its base electrode. The low gain characteristic of transistor 92 under quiescent conditions is preferable as it substantially prevents false actuation or triggering of the pilot chain in response to typical brief duration random noise, particularly noise that may reach the amplifier as the receiver is tuned over its band.

In addition, during this quiescent state a substantial negative potential is applied to the base of transistor 155 through bypassed potentiometer resistance 109. Thus, transistor 155 is rendered heavily conductive and shunt indicator lamp 156 is de-energized.

The received monaural signal available at SCA filter 14 is also applied to the base electrode of stereo detector transistor 131, however, in the absence of a demodulation signal both primary electrodes of this transistor are at a higher potential compared to the base and thus the transistor has a net back or reverse bias which renders it inoperative. The monaural information is translated to the individual amplifying and reproducing means only through the center tap of summing resistors 139, 140. Since both channels are of nominally the same resistance, the monaural information is translated thereto in equal amplitudes and reproduction takes place in conventional monaural fashion.

If the received program is an FM stereophonic broadcast, the output available from the SCA filter and composite amplifier corresponds to the composite modulation signal of that broadcast. The pilot tone portion of this signal is extracted from the remaining components by selectivity block 20 and is applied to the base electrode of amplifier transistor 92. There is sufficient gain in this amplifier, assuming the pilot exceeds a threshold, to translate the 19 kHz. tone to the previously described full-wave rectifier 100 and the succeeding AGC driver stage. The rectified pilot signal is from there coupled to to an amplifying stage 111, the construction of which was previously described.

Of course, the primary function of driver transistor 107 is to provide a high level control potential in response to the presence of the rectified pilot signal. This control potential is developed across bypassed potentiometer 109 and the connection from the high potential terminal of this impedance simultaneously provides a positive, favorable operating bias for the base electrode of AGC amplifier transistor 92 and a reverse bias for stereo indicator transistor 155. Indicator bulb 156 is thus lit to visually acknowledge the reception of a stereo program. In addition, a movable tap on potentiometer 109 provides an adjustable bias for the base electrode of variable resistance transistor 97. When the bias at the base electrode of transistor 97 increases sufficiently to exceed an operative threshold, the resistance of this device is automatically varied so as to dynamically limit the amplitude of the full-wave rectified pilot signal to a prescribed level proportional to the positioning of the movable potentiometer tap.

As will be recalled, Schmitt trigger circuit 114 comprises a pair of transistors 115 and 116 and during quiescent conditions transistor 116 is in a saturated or on condition and transistor 115 is nonconductive. In conformity with conventional monostable multivibrator operation, a signal of an appropriate value at the base of transistor 115 initiates conduction therein while simultaneously biasing transistor 116 to an off condition through coupling resistor 119. During stereo reception, the Schmitt trigger circuit is actuated by the full-wave rectified pilot signal sketched on FIGURE 7 adjacent transistor 115. The dashed line on the sketch represents the nominal operating bias at the base electrode of transistor 115 from voltage divider 117, 118 and a signal amplitude above the dashed line renders transistor 115 conductive. Proper adjustment of this bias allows multivibrator transistor 115 to be on during a time equal to that of one-half the period of the rectified pilot tone and off during the remaining one-half period, thus establishing a desired 50–50 duty cycle for the multivibrator. As is apparent, a square-wave switching signal at twice the rate of the 19 kHz. tone is thus generated at the collector electrodes of the multivibrator transistors and is applied in push-pull to the load circuits 132, 133 of stereo detector 131 through buffer amplifiers 125, 126.

Concurrently with the application of the 38 kHz. demodulation signal to the primary electrodes of stereo detector transistor 131, the composite stereo signal is applied to its base electrode from SCA filter 14. As explained more fully in the previously mentioned Dias and Dias et al. patents, the suppressed-carrier amplitude-modulation components of the composite signal are detected in one polarity in load resistor 132 and in an opposite polarity in load resistor 133 by intermodulation with the subcarrier-frequency demodulating signal. By the complex action of this detector, the audio sum signal is not translated through the base electrode to either of the load circuits. Hence, the matrixing connection taken from the midpoint of the voltage divider resistors 136, 137 is necessary to effect the desired stereo separation. The high frequency components applied through the matrixing connection are bypassed to ground by respective de-emphasis filters 148 and 152, no additional filtering being needed.

The demodulation signal generator and stereo detector means above-described performs comparably with conventional stereo receivers while utilizing components of only types and magnitudes capable of construction by integrated circuit techniques. Further, the described full-wave rectifier accomplishes its function without provision of a separate phase-splitting means as required in the prior art.

I claim:

1. A receiver for developing a pair of stereophonically related program signals from a received transmission comprising a carrier frequency-modulated in accordance with the sum of two audio signals, a subcarrier signal which has been suppressed-carrier amplitude-modulated with the difference of said two audio signals, and a pilot signal subharmonically related to said subcarrier signal, said receiver comprising:

a frequency modulation detector responsive to said carrier for deriving a composite signal representing the modulation of said carrier;

an integrated-circuit, solid-state demodulation signal generator and stereo detector means, consisting of untuned stages all of the bilateral passive circuit elements of which are resistive or capacitive, for developing a subcarrier demodulation signal in response to said pilot signal and for deriving said pair of stereophonically related program signals in response to said audio sum signals, said difference signal modulation and said developed subcarrier demodulation signal;

and tuned inductor circuit means, coupled between said frequency modulation detector and said generator and stereo detector means, for selectively extracting said pilot signal from said composite signal with a signal to noise ratio of a magnitude sufficiently high to permit derivation of said demodulation signal within said generator and stereo detector means without provision of frequency tuned circuitry therein.

2. The combination according to claim 1 in which said demodulation signal generator means comprises a full-wave rectifier for said pilot signal and a Schmitt trigger type multivibrator responsive to said full-wave rectified pilot signal and included within said integrated-circuit means for developing said demodulation signal.

3. The combination according to claim 2 in which said stereo detector means comprises a pair of load resistors and a transistor having a base electrode coupled to said frequency modulation detector and its emitter and collector electrodes coupled to said Schmitt trigger multivibrator through respective ones of said load resistors.

4. The combination according to claim 1 in which the circuit Q of said tuned inductor means is at least fifty.

5. The combination according to claim 4 in which said tuned inductor circuit means comprises a pair of discrete component inductor coils each tuned to said pilot signal frequency and interconnected by a coupling capacitor.

6. The combination according to claim 1 in which said demodulation signal generator means further comprises:

a pair of complementary transistors each including emitter, base and collector electrodes;

coupling means for applying said pilot signal in a common phase to said base electrodes;

and means including a common load impedance coupled to an emitter electrode of one of said transistors and a collector electrode of the other of said transistors for effecting full-wave rectification of said pilot signal.

7. The combination according to claim 6 in which the remaining collector and emitter electrodes of said transistors are coupled to individual load impedances of a relative magnitude for equalizing the amplitude of alternate half-cycles of said full-wave rectified pilot signal.

8. The combination according to claim 7 and further comprising:

an automatic gain control transistor coupled between said tuned inductor means and said coupling means;

a field effect transistor including source, drain and base electrodes and having said source and drain electrodes coupled in series with the emitter of said gain control transistor;

and means for applying the DC component of said full-waved rectified pilot signal to said base electrode in a polarity to maintain the magnitude of said rectified pilot signal substantially constant over a predetermined range independent of variations in the amplitude of said pilot signal as applied to said base electrodes of said complementary transistors.

References Cited

UNITED STATES PATENTS 3,018,371 1/1962 Order ------------- 325—349

RALPH D. BLAKESLEE, Primary Examiner